United States Patent [19]
Kuo

[11] Patent Number: 5,520,013
[45] Date of Patent: May 28, 1996

[54] FOOD FREEZING CONVEYOR SYSTEM

[75] Inventor: Ju-Chia Kuo, Hsinchu, Taiwan

[73] Assignee: Industrial Technology Research Institute, Hsinchu, Taiwan

[21] Appl. No.: 461,981

[22] Filed: Jun. 5, 1995

[51] Int. Cl.⁶ .................................................. F25D 25/00
[52] U.S. Cl. ................................ 62/380; 62/378; 62/63
[58] Field of Search .................. 62/378, 380, 381, 62/382, 63; 198/347.4, 463.3, 607, 952

[56] References Cited

U.S. PATENT DOCUMENTS

| | | | |
|---|---|---|---|
| 1,675,260 | 6/1928 | Edmunds . | |
| 3,688,518 | 9/1972 | Goltsos | 62/380 X |
| 3,701,263 | 10/1972 | Barrett | 62/382 X |
| 3,831,293 | 8/1974 | Ingram et al. | 62/378 X |
| 3,952,540 | 4/1976 | Okada et al. | 62/380 X |
| 4,078,398 | 3/1978 | Cloudy | 62/380 |
| 4,196,802 | 4/1980 | Lorentzen | 62/380 X |
| 4,345,443 | 8/1982 | Yamashita | 62/380 |
| 4,584,849 | 4/1986 | Cloudy et al. | 62/380 |
| 4,699,263 | 10/1987 | Nakamura et al. | 198/435 |

*Primary Examiner*—Christopher B. Kilner
*Attorney, Agent, or Firm*—Beveridge, DeGrandi, Weilacher & Young

[57] ABSTRACT

A food freezing conveyor system includes a conveying apparatus consisting of multiple tiers of conveyors, a lower horizontal conveying mechanism, a lifting conveying mechanism, an upper horizontal conveying mechanism and a dropping conveying mechanism. Food products to be frozen are transported along an inverted-U shaped path within a freezing chamber. The lifting conveying mechanism and the dropping conveying mechanism are respectively provided with multiple tiers of choke plates on both sides. Each tier of choke plates and each tier of conveyors jointly define a plurality of inter-connected airflow passages, dividing a freezing operation zone and a manhole maintenance space. Two sets of evaporators and fan devices disposed diagonally on opposite sides of the freezing chamber generate a freezing air flow of a suitable temperature, which is induced into the airflow passages to flow past an upper freezing zone and a lower freezing zone to complete a circulation cycle, in which the freezing air speed in the upper freezing zone is greater than that in the lower freezing zone.

17 Claims, 11 Drawing Sheets

FOOD FREEZING CONVEYOR SYSTEM

BACKGROUND OF THE INVENTION (a) Field of the Invention

The present invention relates generally to a freezing conveyor system, and more particularly to a food freezing conveyor system which provides quick freezing and facilitates maintenance and repairs.

(b) Description of the Prior Art

Freezing conveyors are indispensable in frozen food processing. Growing demands for frozen foods result in increasing demands for freezing conveyors. There is a great variety of freezing conveyors which differ according to the kind of food products, processing methods, and quality and nutrition contents of the food products. At present, the most widely used freezing conveyors fall into two types, namely, continuous linear chain conveyors and spiral freezing conveyors.

U.S. Pat. No. 4,378,873 discloses a continuous linear chain conveyor system operating through multiple tiers for transporting a food product which is to be either cooled, frozen or warmed. U.S. Pat. No. 4,584,849 provides an improvement over U.S. Pat. No. 4,078,398 which teaches a freezing airflow apparatus with good airflow and floor space economy. U.S. Pat. No. 4,584,849 aims to provide safe and quiet food freezing tunnels for quick, individual and consistent freezing of food products and for operation over long running times with greater efficiency. The conventional continuous linear chain conveyors or food freezing tunnels are substantially linear in plan structure. Although they have the advantages of simple construction, low costs and volatility, they occupy large floor space. In addition, the operation capacity of continuous linear chain conveyor systems cannot be significantly raised and the energy needed for freezing is easily dissipated.

U.S. Pat. No. 3,938,651 provides a spiral conveyor. A similar invention is found in U.S. Pat. No. 5,105,934 which discloses a conveyor system with an endless conveyor belt employed in a food freezing tunnel. Such a spiral construction has the merits of floor space economy, higher capacity and greater efficiency. But there are several drawbacks which need to be overcome. The internal drum or cage arranged in the middle section of the conveyor uses up a lot of space; the width of the conveyor belt is restricted by the varying speed of rotation of points of varying radii, and the conveying chains may easily wear. Besides, the airflow path is not smooth, i.e., the airflow efficiency not very ideal.

SUMMARY OF THE INVENTION

A primary object of the present invention is to provide a food freezing conveyor which permits smooth three-dimensional freezing operation, saves floor space, allows expansion of operation zones, and reduces loss of energy.

Another object of the present invention is to provide a food freezing conveyor system utilizing induced air circulation, in which choke plates and conveyors consisting of thermal conductive plates jointly define freezing air passages to separate a freezing operation zone from a manhole maintenance space, so as to prevent undue waste of refrigerating energy and to effectively freeze food products; besides, each conveyor is provided with parallel fins to increase the heat transfer area, which not only raises freezing rate but also enhances freezing capacity and efficiency.

Still another object of the present invention is to provide a food freezing conveyor system, in which the speed of the freezing air in an upper zone of the freezing chamber is greater than that in a lower zone of the freezing chamber, so as to minimize dehydration and loss of weight of the food products to be frozen resulting from the pressure difference between the inside and outside of the freezing chamber. Such an arrangement not only reduces frosting rate of the evaporators but also prevents possible sales loss due to loss of weight of the frozen food products.

A further object of the present invention is to provide a food freezing conveyor system, in which each of the conveyors for carrying food products to be frozen consists of a plurality of inter-connected thermal conductive plates extending transversely and longitudinally such that the conveyor may be configured to have a desired length and width suitable for any kind and any size of freezing systems.

To achieve the above-mentioned objects, the food freezing conveyor system of the present invention comprises an air-tight freezing chamber and a couple of auxiliary freezing chambers, a conveying apparatus, and a pair of evaporators and fan devices disposed on opposite sides of the freezing chamber. The conveying apparatus includes a lower horizontal conveying mechanism, a lifting conveying mechanism, an upper horizontal conveying mechanism, a dropping conveying mechanism and a multiplicity of conveyors for carrying food products to be frozen. Each conveyor is formed from a plurality of die cast inter-connected thermal conductive plates constituting a freezing plate of a large area. Each conveyor may be carried in sequence by the lower horizontal conveying mechanism, the lifting conveying mechanism, the upper horizontal conveying mechanism and the dropping conveying mechanism, forming a three-dimensional food freezing zone and food conveyance path. Each conveyor and the choke plates on the lifting conveying mechanism and the dropping conveying mechanism jointly define a plurality of inter-connected freezing air passages into which the freezing air generated by the evaporators and the fan devices is induced, so that the food products carried on the conveyors may be quickly frozen. And since the conveyors and the choke plates can effectively separate the freezing operation zone and the manhole maintenance space, the freezing air speed in the freezing operation zone may be increased. Besides, as each conveyor is provided with parallel fins to increase heat transfer efficiency, the freezing rate may be drastically raised.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
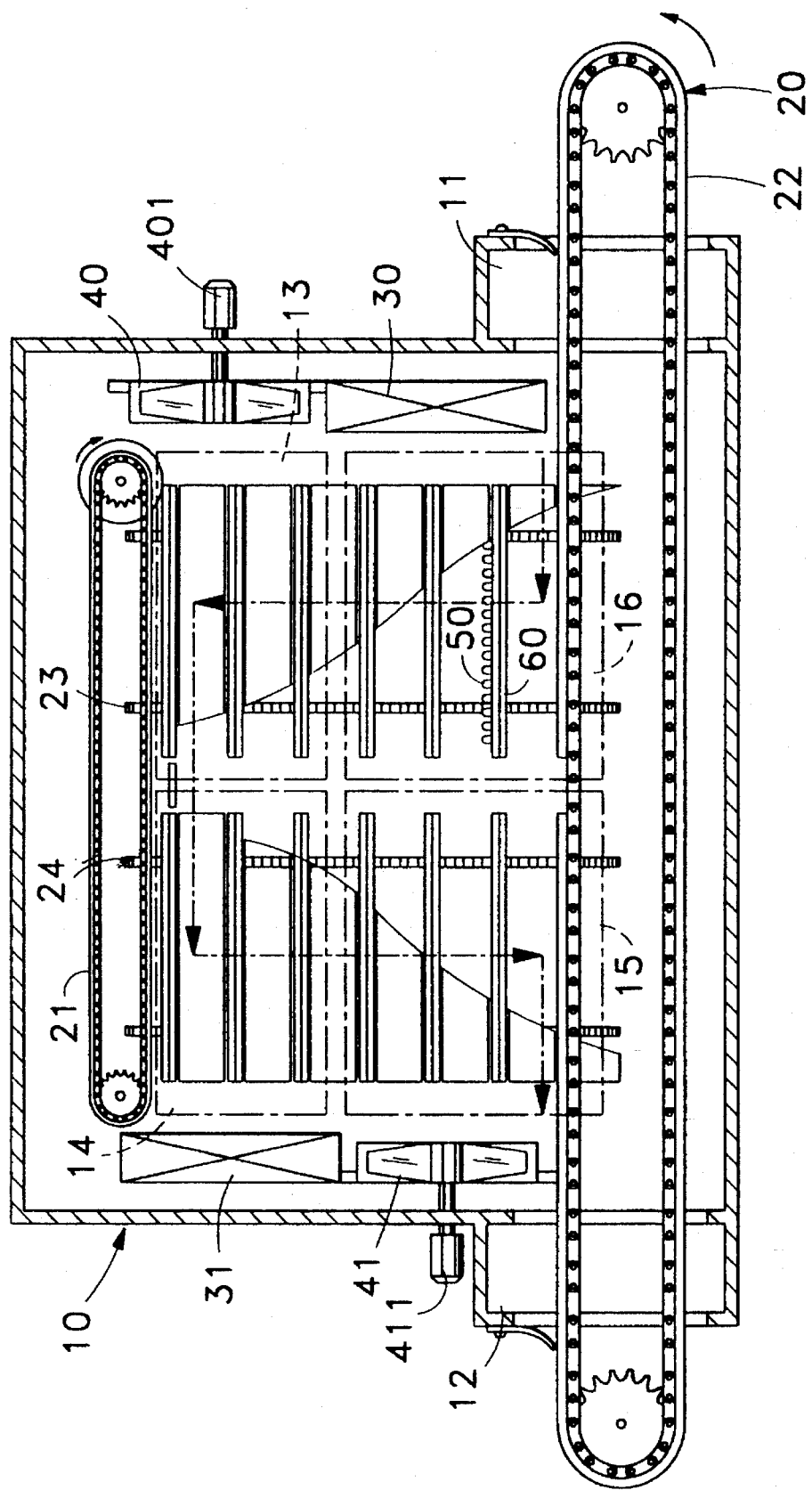
FIG. 1 is a front view of the freezing conveyor system of the present invention.
Figure 2:
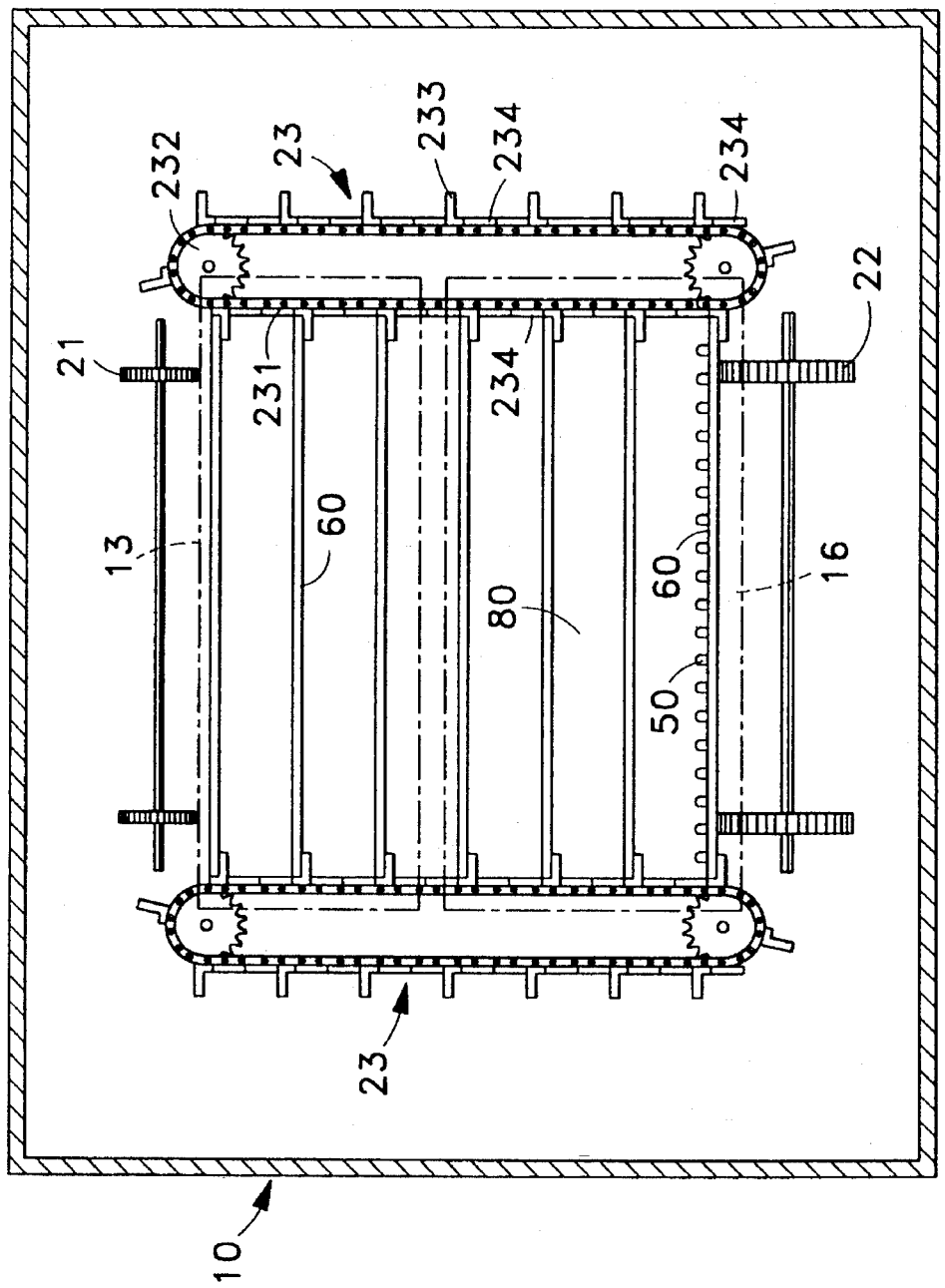
FIG. 2 is a side view of the freezing conveyor system of the present invention.

With reference to FIGS. 1 and 2, the food freezing conveyor system according to the present invention mainly comprises a freezing chamber 10 with air-tight effects and two auxiliary freezing chambers 11, 12; a conveying apparatus 20, a couple of evaporators 30, 31 respectively disposed diagonally at opposite sides of the freezing chamber 10 for generating a freezing air current of a suitable temperature, and fan devices 41, 42. The conveying device 20 includes a lower horizontal conveying mechanism 22, a lifting conveying mechanism 23, an upper horizontal conveying mechanism 21, a dropping conveying mechanism 24 and a plurality of conveyors 60 arranged in a row for carrying food products 50 to be frozen. Each conveyor 60 carrying food product 50 is firstly transported into the freezing chamber 10 by means of the lower horizontal conveying mechanism 22. Then it is delivered upwardly by the lifting conveying mechanism 23 which rises perpendicularly. The conveyor 60 is further conveyed horizontally to the other side of the freezing chamber 10 by means of the upper horizontal conveying mechanism 21. Subsequently, it is returned to the lower horizontal conveying mechanism 22 by means of the dropping conveying mechanism 24 which moves vertically downward, and finally, it is conveyed out of the freezing chamber 10. The conveyance path described above is illustrated in FIG. 1, which shows an inverted-U shaped path indicated by the arrows.

Figure 3:
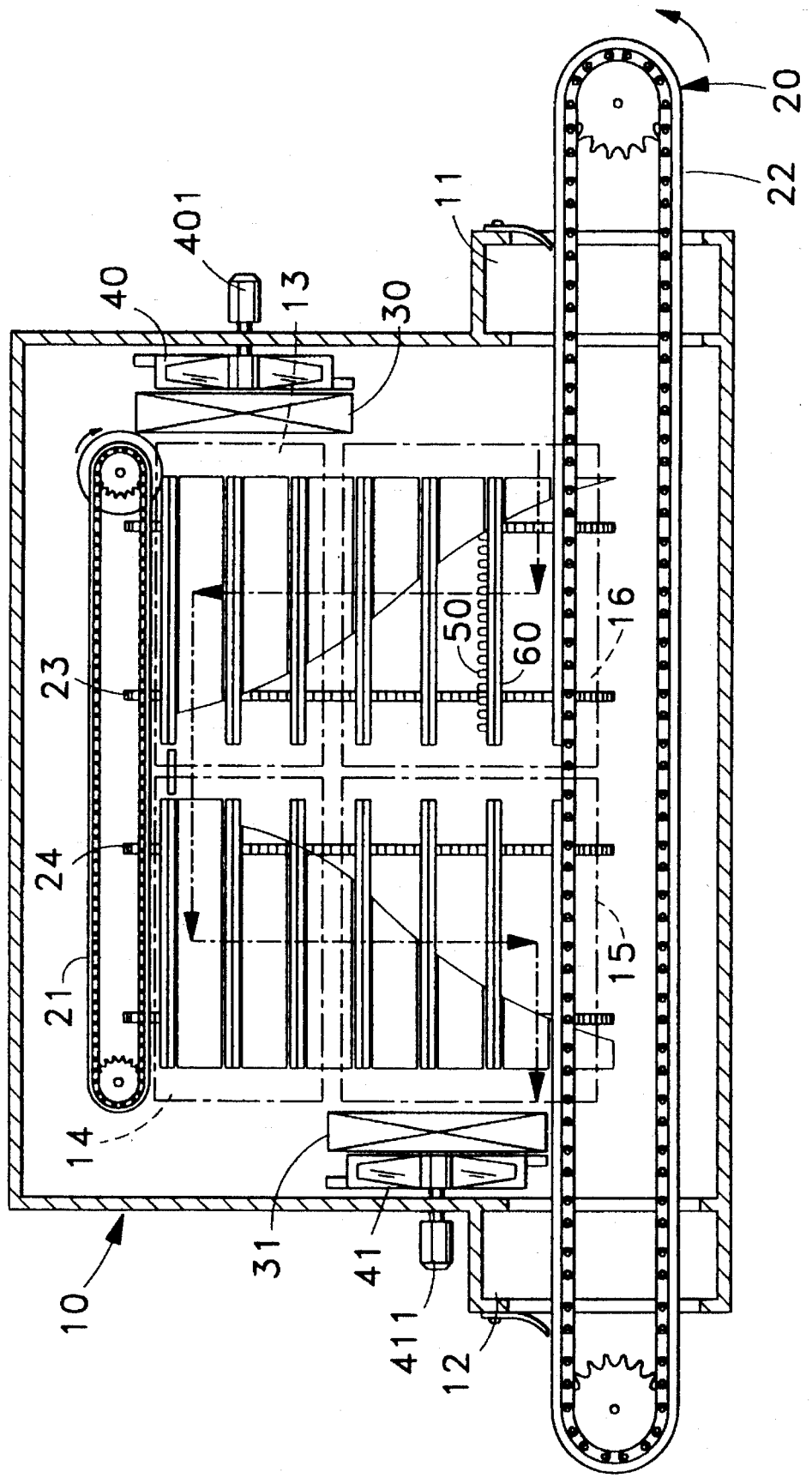
FIG. 3 is a front view of another preferred embodiment of the freezing conveyor system of the present invention.

As shown in FIGS. 1 and 3, a combination of an evaporator 30 and a fan device 40 and another combination of an evaporator 31 and a fan device 41 are disposed substantially diagonally on opposite sides (i.e., in the vicinity of a food entrance and a food exit) of the freezing chamber 10. The evaporator 30 and fan device 40 or the evaporator 31 and fan device 41 on the same side may be placed one on top of the other as in FIG. 1, or with one in the front, the other at the back in a horizontal manner as in FIG. 3. The diagonal arrangement of the evaporators 30, 31 and fan devices 40, 41 at opposite sides of the freezing chamber 10 eliminates the problems of inconvenient maintenance and repairs, poor airflow and uneven airflow speed in the prior art in which the evaporators and fan devices are located at the back of the freezing chamber 10. In the present invention, freezing air flows past an upper zone 13 of the lifting conveying mechanism 23, an upper zone 14 of the dropping conveying mechanism 24, a lower zone 15 of the dropping conveying mechanism 24, and a lower zone 16 of the lifting conveying mechanism 23 to complete one cycle. This arrangement of airflow causes the freezing air speed in the upper zones 13, 14 to be higher than that in the lower zones 15, 16. When lukewarm food products 50 to be frozen enter the interior of the freezing chamber 10, they are conveyed into the lower zone 16 where the freezing air speed is low. The temperature of the food products 50 to be frozen is lowered to prevent possible dehydration and weight loss of the food due to the great difference between the external and internal pressures of the freezing chamber 10. Such an arrangement not only decreases the frosting rate of the evaporators 30, 31, but also minimizes sales losses resulted from severe dehydration and weight loss of the frozen food products as in conventional food freezing conveyors. As for the upper zones 13, 14, the speed of the freezing air therein is higher and more concentrated, forming quick freezing zones to achieve a freezing rate higher than that in the prior art. Furthermore, auxiliary chambers 11, 12 are respectively installed at a food entrance and food exit for reducing dissipation rate of freezing air therethrough, so as to increase freezing efficiency and save energy. In addition, drive motors 401, 411 of the respective fan devices 40, 41 are mounted severally on the outer walls of the freezing chamber 10 to minimize the effects of the heat generated by the freezing chamber 10 on its freezing efficiency.

Figure 4:
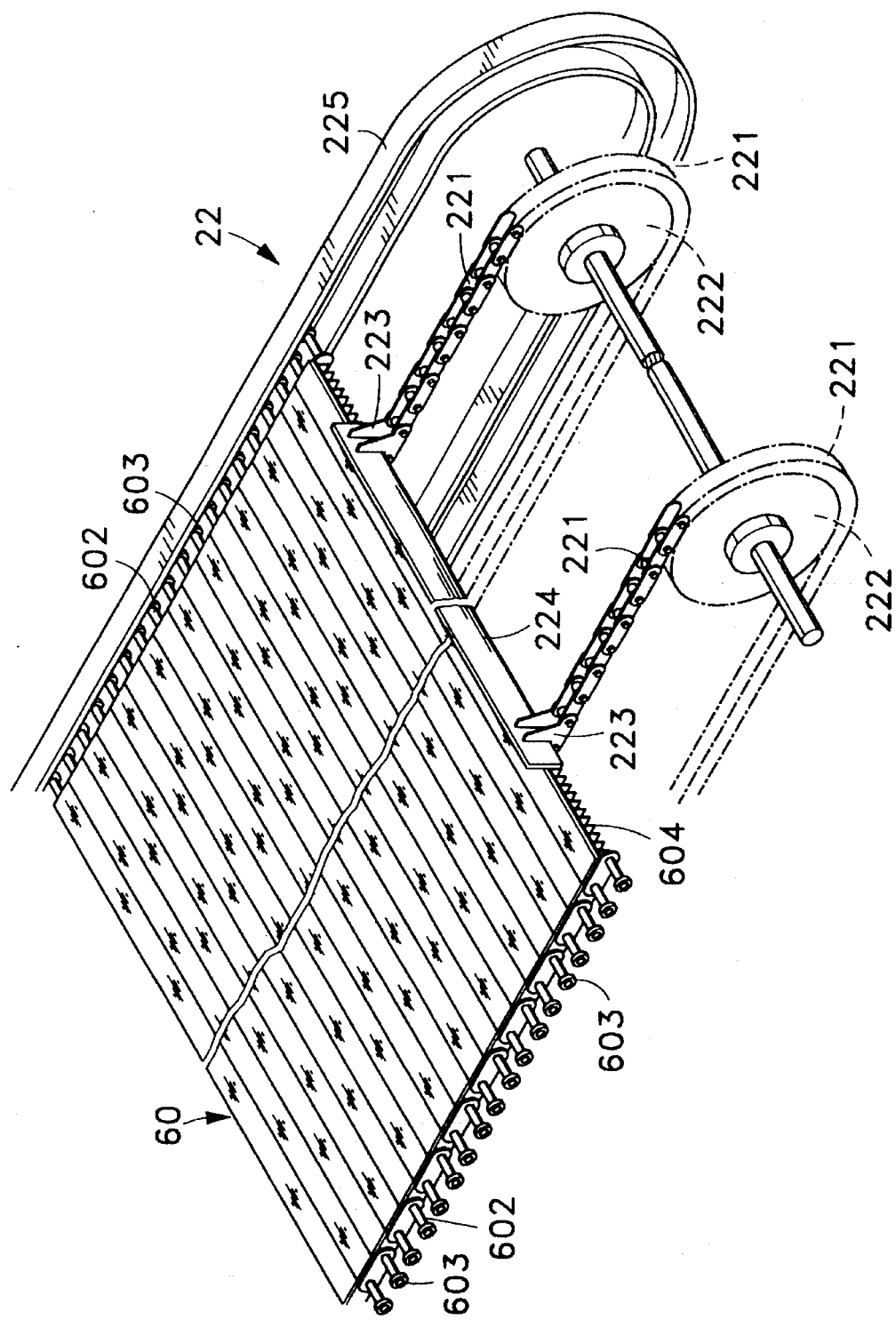
FIG. 4 is an enlarged perspective view of the horizontal conveying mechanism and conveyor of the freezing conveyor system of the present invention.
Figure 5:
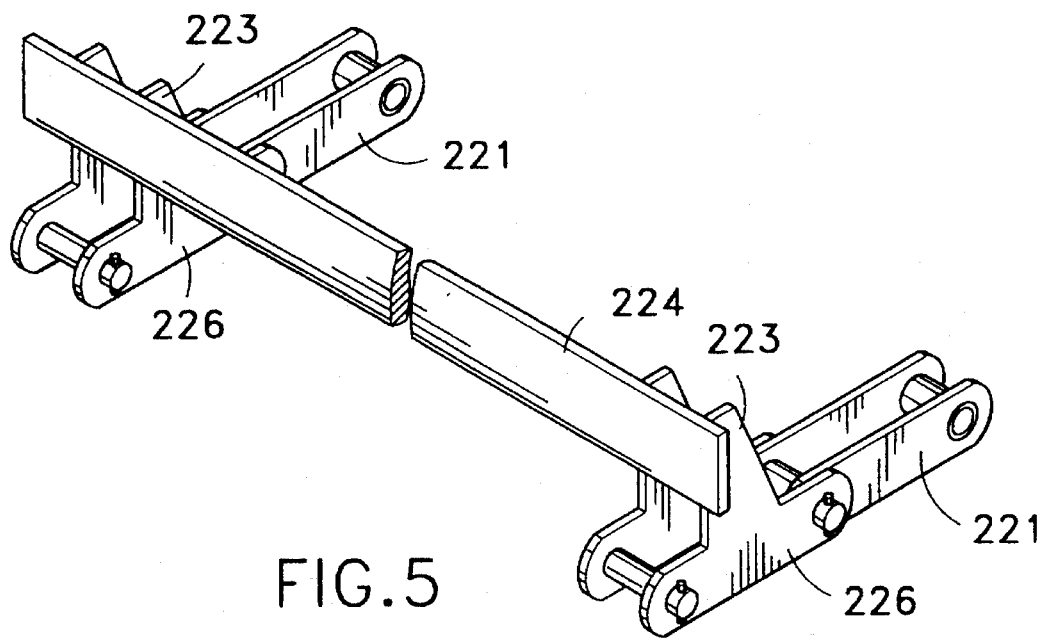
FIG. 5 is an enlarged perspective view of a push plate used in transversely pushing the conveyor in the lower horizontal conveying mechanism.
Figure 6:
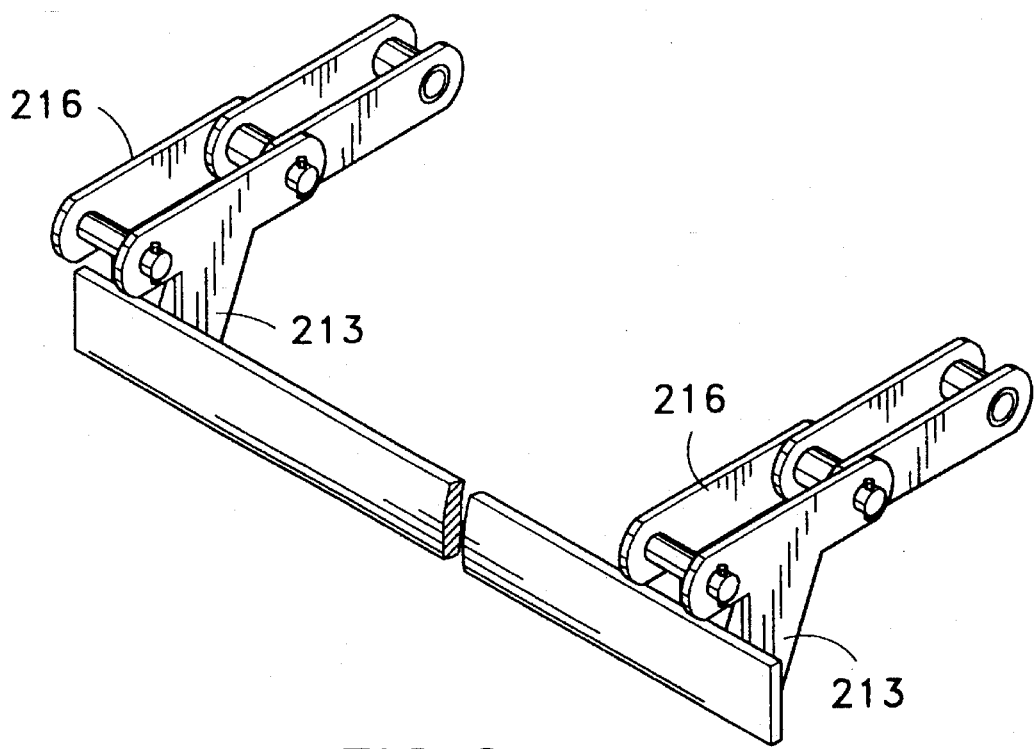
FIG. 6 is an enlarged perspective view of a push plate used in transversely pushing the conveyor in the upper horizontal conveying mechanism.

The construction of the two horizontal conveying mechanisms 21, 22 for transferring the conveyors 60 is shown in FIGS. 4 to 6. Each horizontal conveying mechanism consists of two guide rails 225 (only one side guide rail is shown in the drawings) arranged on both sides thereof and having a substantially C-shaped cross section, and drive sprockets 222 and chains 221 for actuating the conveyors 60. A plurality of support elements 602 and rollers 603 are provided on both sides of the conveyor 60. Each roller 603 is mounted above the bottom side of the C-shaped guide rail 225, so that the conveyor 60 may be precisely supported and positioned by the C-shaped guide rails 225. Each chain 221 is provided with a link 226 having a projection 223 at an interval of length equivalent to that of the conveyor 60. A vertical push plate 224 is further mounted between two projections 223 and abuts against the edge of the conveyor 60. Therefore, when the sprockets 222 bring the chains 223 to turn therewith, the push plate 224 pushes the conveyor 60 to move horizontally. Since little frictional loss is generated between the rollers 603 and the C-shaped guide rails 225, costs of a sprocket motor (not shown) as well as its power consumption may be saved. Besides, since the conveyor 60 is precisely supported and positioned by the C-shaped guide rails 225, conveyance error probability may be reduced. In the present invention, the structure of the upper horizontal conveying mechanism 21 is essentially the same as that of tile lower horizontal conveying mechanism 22. The only difference is that the projections 213 on the links 216 of the former extend downwardly (see FIG. 6) while those of the latter extend upwardly.

Figure 7:
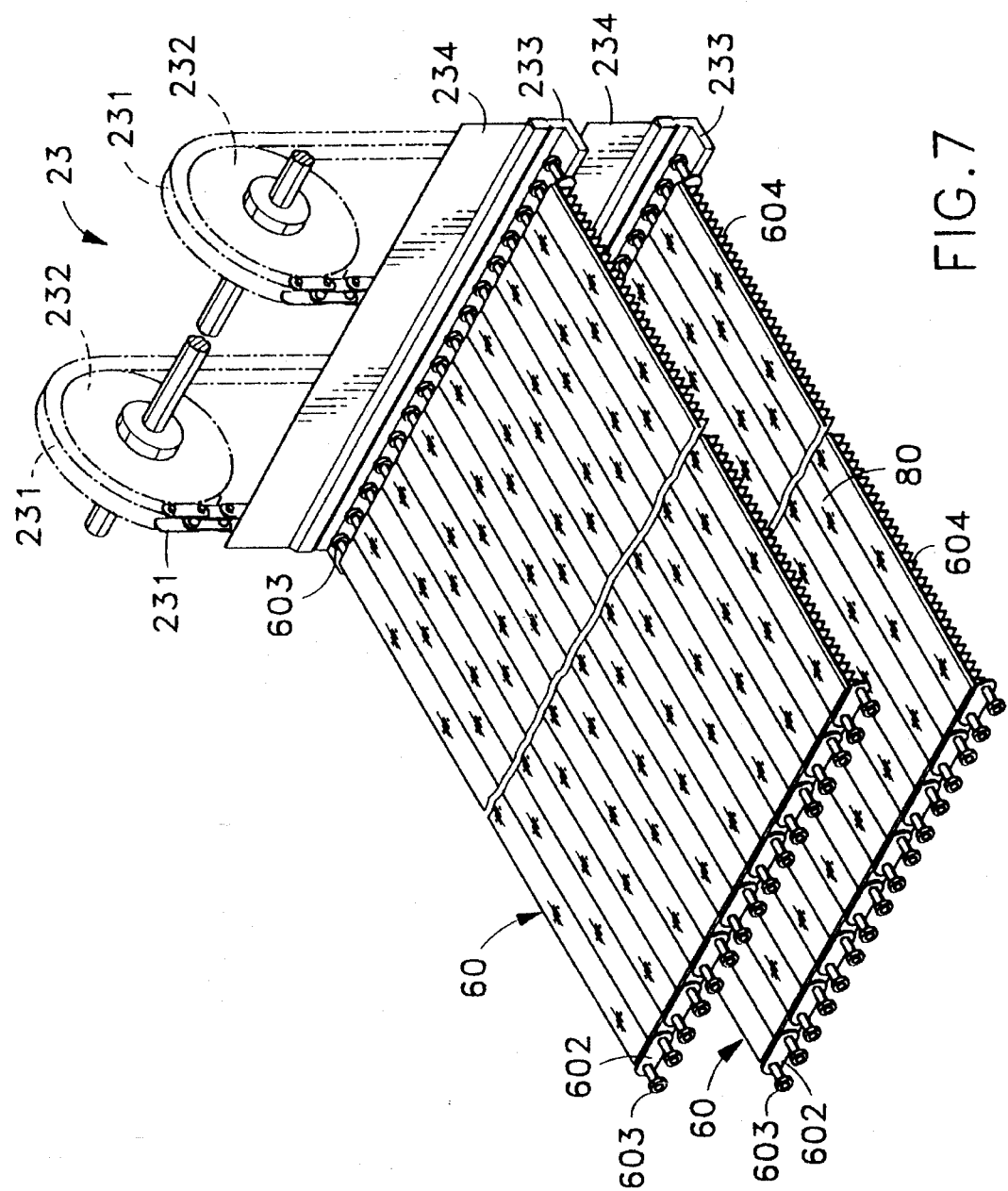
FIG. 7 is an enlarged perspective view of the vertical lifting conveying mechanism and the conveyors.
Figure 8:
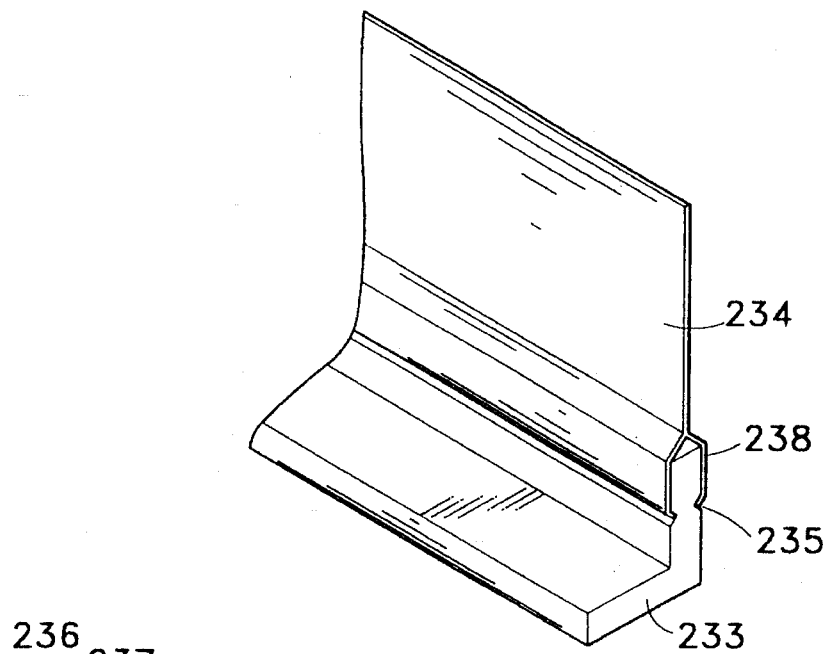
FIG. 8 is a partial perspective view of a first preferred embodiment of the choke means installed on the vertical lifting conveying mechanism.
Figure 9:
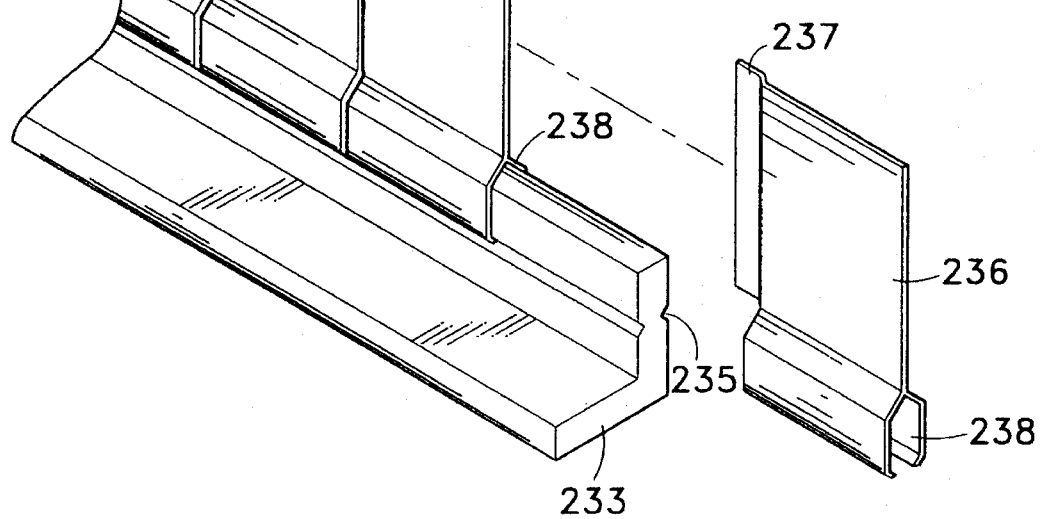
FIG. 9 is a partial perspective view of a second preferred embodiment of the choke means.
Figure 10:
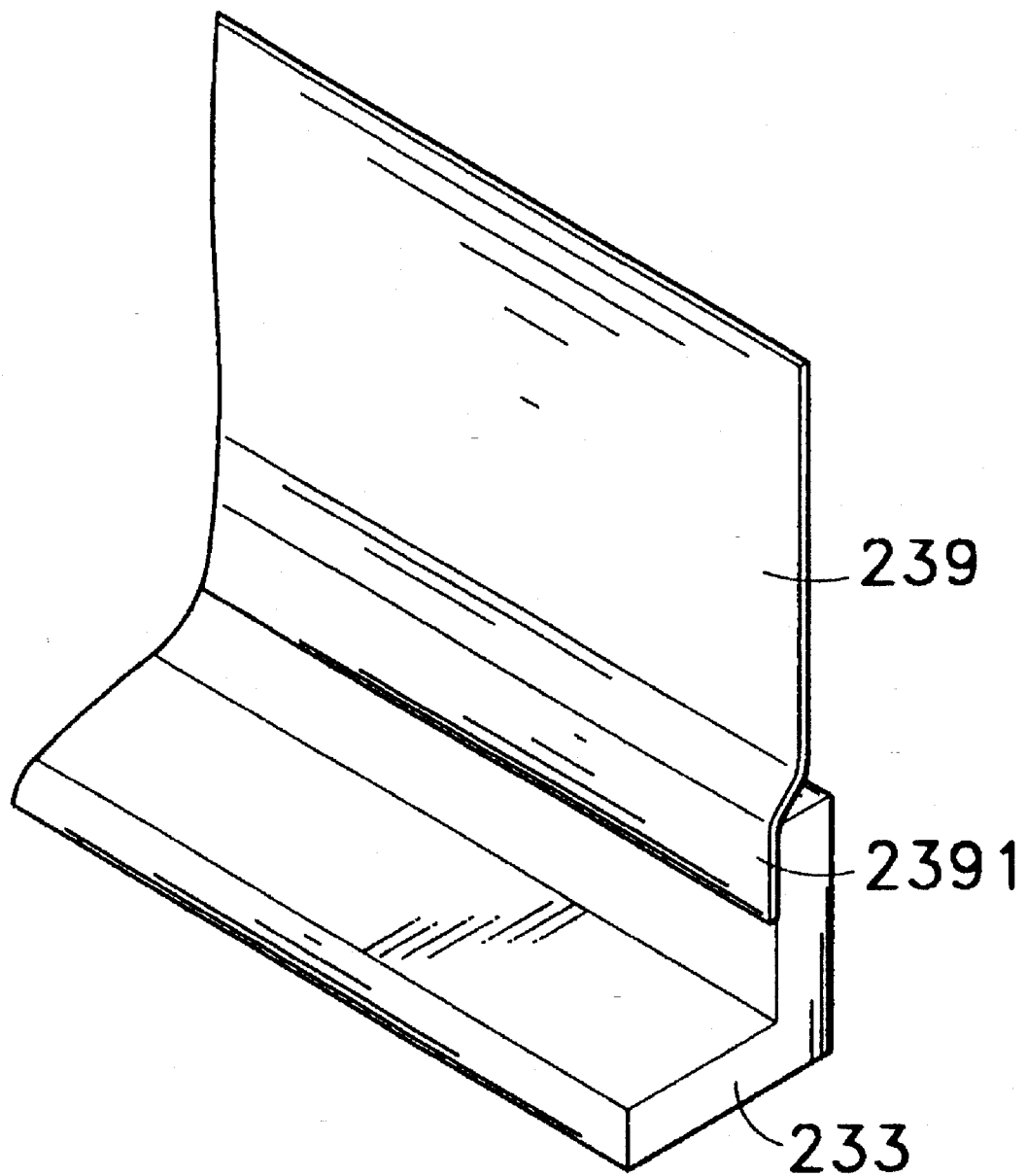
FIG. 10 is a partial perspective view of a third preferred embodiment of the choke means.
Figure 11:
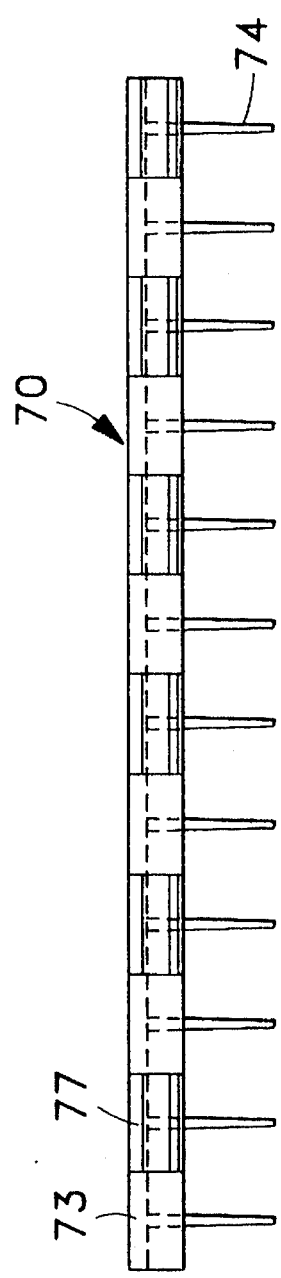
FIG. 11 is a front view of a single thermal conductive plate constituting the conveyor body.
Figure 12:
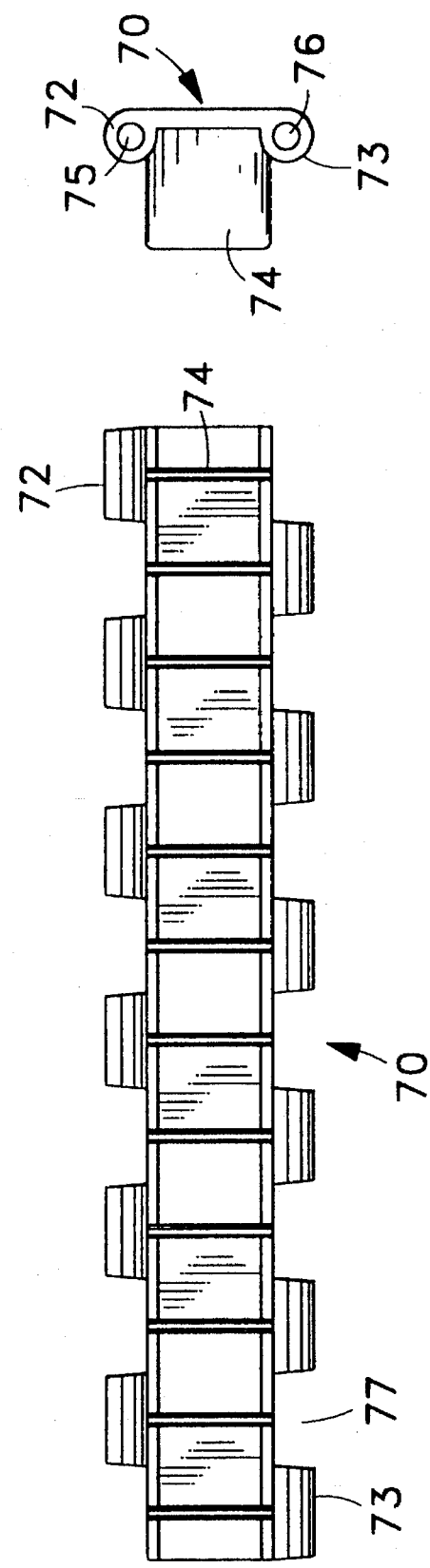
FIG. 12 is a bottom view of the thermal conductive plate.
Figure 13:
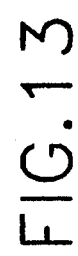
FIG. 13 is a side view of the thermal conductive plate.

With reference to FIG. 7, the lifting conveying mechanism 23 includes two sprocket sets 232 and their chains 231 (only one set is shown) disposed at either sides of the lifting conveying mechanism 23. A plurality of horizontal angle bars 233 are mounted on the chain 231 at a certain distance from each other. Each angle bar 233 is just located in a notch of the C-shaped guide rail of the horizontal conveying mechanism 22 for receiving the conveyor 60 transported by the horizontal conveying mechanism 22 to be positioned thereon. When each of the rollers 603 at both sides of the conveyor 60 is moved to the angle bar 223 by the C-shaped guide rail 225, the horizontal conveying mechanism 22 will stop moving. Instead, the lifting conveying mechanism 23, by means of the angle bar 233, brings the conveyor 60 to move upwardly. The upper side of the angle bar 233 is provided with a choke means 234 having a length equivalent to that of the conveyor 60. A plurality of freezing air passages 80 are defined between two conveyors 60 and the choke means 234 at their sides. Freezing air is induced into the air passages 80 to enhance the airflow speed therein, so that the food products 50 carried by the conveyors 60 may be quickly frozen. FIGS. 8 and 9 show the engagement of the angle bar 233 and the choke means 234. An insert groove 235 is provided in either sides of the vertical wall of the angle bar 233. The choke means 2 34 has an inverted-U shaped clamp plate 238 which may be fitted onto the angle bar 233 to be retained in place by the inserted grooves 235. If the conveyor 60 is too long, the single choke means 234 shown in FIG. 8 may be modified into a series of choke plates 236. Each choke plate 236 further has a deflected plate at an edge thereof in addition to the inverted-U shaped clamp plate 238. After the choke plates 236 are assembled, the deflected plate 237 of each choke plate just overlaps an edge of the adjacent choke plate 236 to ensure choking effects. In addition, the choke plate 239 shown in FIG. 10 may be directly secured on the chain 231 (not shown) instead of being fitted onto the angle bar 233 by means of the inverted-U shaped clamp plate. The choke plate 239 is provided with a deflected plate 2391 which bends forwardly and then extends downwardly, and the deflected plate 2391 partly overlaps the angle bar 231 to ensure the choking effects.

The structure of the dropping conveying mechanism 24 is completely the same as that of the lifting conveying mechanism 23, their only difference being the direction of conveyance. It is therefore not discussed in detail herein.

Figure 15:
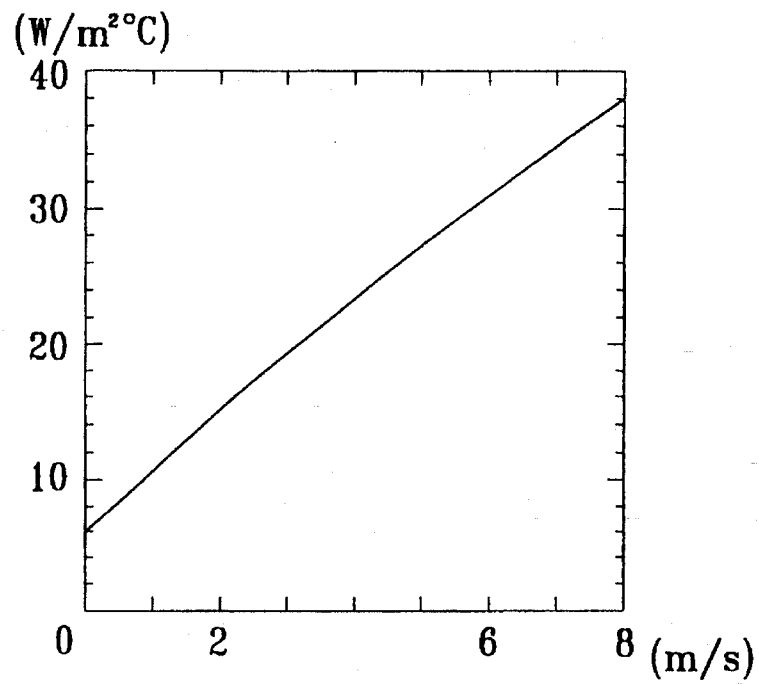
FIG. 15 is a curve diagram of the heat transfer coefficient relationship between the freezing airflow speed and the food product.

In the conventional food freezing conveyor systems, a manhole space is usually provided in the interior of the freezing chamber for access of maintenance personnel thereinto. Such a manhole space which is not a part of the freezing operation zone is quite large in area. Since it is disposed in the freezing operation zone where the conveyors are located, such an arrangement not only wastes energy but also significantly reduces the average freezing air speed in the freezing operation zone. As shown in FIG. 15, the heat transfer co-efficient proportionally increases with the freezing air speed. Therefore, reduced freezing air speed significantly affects the frozen rate. In the present invention, the design of the freezing air path 80 defined by the choke plate 234, 236 or 239 not only prevents dissipation of freezing energy but also induces freezing air into the air path 80, effectively increasing the average freezing air speed in the freezing operation zone, thereby speeding up the freezing rate of the food products. Hence, a major advantage of the present invention is that comparatively high freezing efficiency may be achieved with a comparatively smaller freezing chamber.

Figure 14:
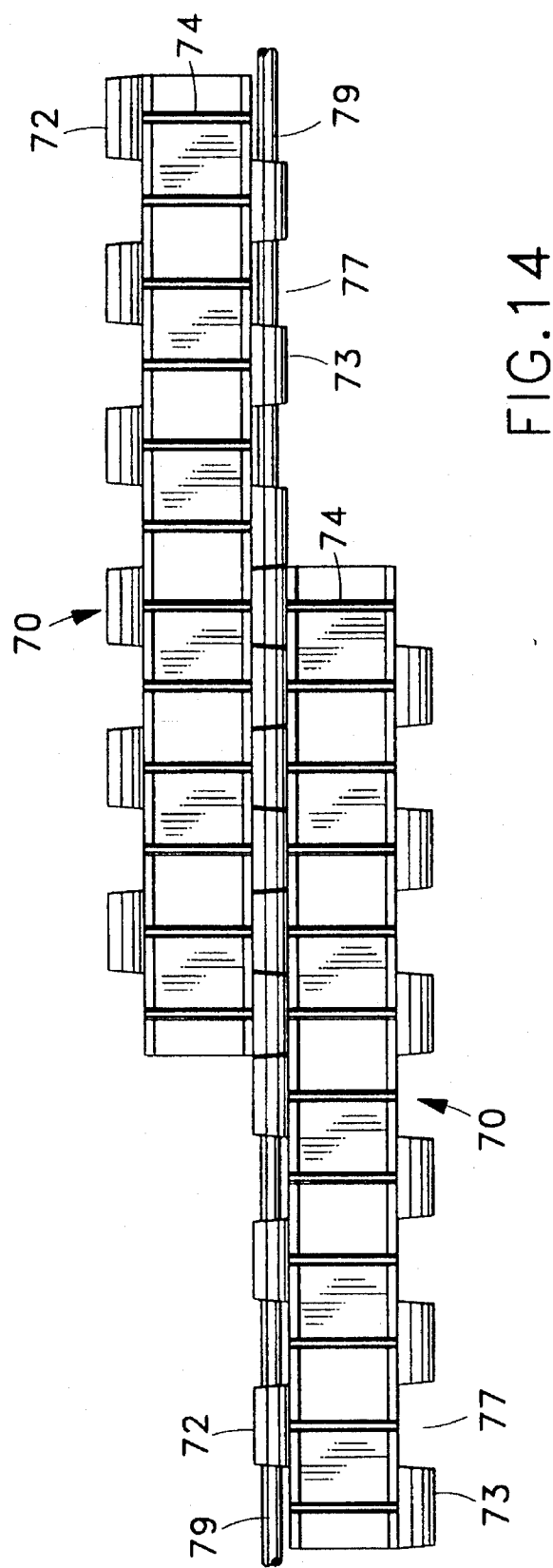
FIG. 14 is a bottom view showing two thermal conductive plates inter-connected as an integral whole.
Figure 16:
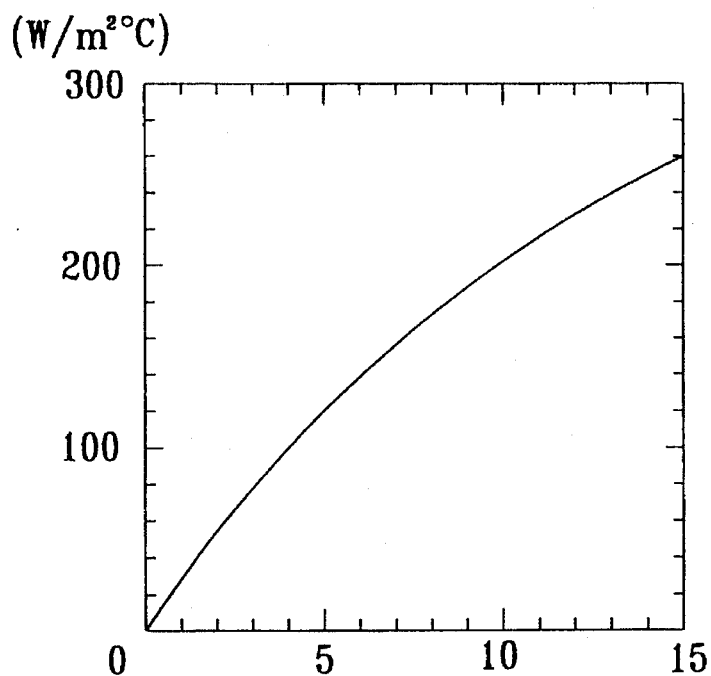
FIG. 16 is a curve diagram of the heat transfer coefficient relationship between the area ratio of the conveyor's fins and flat food products.

An entire piece of freezing plate with thermal conductive fins 604 provided at the bottom side thereof and having a high heat transfer coefficient and an entire piece of freezing plate having a high heat transfer coefficient may be used as each tier of conveyors. Alternatively, as shown in FIGS. 11 to 14, a plurality of module type thermal conductive sheets 70 are inter-connected to form thermal conductive means. Each thermal conductive sheet 70 is provided with a plurality of lugs 72, 73 equally spaced apart and alternatively arranged on both sides thereof. Each of the lugs 72, 73 are respectively provided with coaxial holes 75, 76 for passage of a spindle therethrough. As shown in FIG. 14, the lug 72 of one of the two adjacent thermal conductive sheets 70 is fitted between a pitch 77 between two adjacent lugs 73 of another thermal conductive sheet 70. The spindle 79 is used to pass through each of the coaxial holes 75, 76 of the two adjacent thermal conductive sheets 70, so that adjacent thermal conductive sheets 70 connect together as a whole. Likewise, a plurality of spindles 79 may be employed to join the thermal conductive sheets 70 in a transverse or longitudinal manner, so that the length or width of the conveyor may be flexibly determined. Each thermal conductive sheet may be integrally die cast from metals, e.g., aluminum, or non-metals which have good heat transfer efficiency. The bottom side of the thermal conductive sheet 70 may be further provided with a plurality of parallel fins 74 which extend downwardly for enhancing the heat transfer coefficient of each thermal conductive sheet 70. Whether an integral freezing plate or module type thermal conductive sheets 70 are adopted, the thermal conductive fins 604 or 73 provided at the bottom side must be parallel to the direction of airflow, so as to not affect the speed of the freezing air and to increase the heat exchange area of the conveyors 60 and freezing air. Hence, the conveyors 60 may absorb more energy from the freezing air to speed up freezing of the food products 50. As shown in FIG. 16, when the area ratio of the fins of the freezing plate increases from 1 to 5, the heat transfer coefficient of that flat food products is increased by almost five times. Therefore, in the present invention, the conveyors 60 provided with fins may effectively utilize energy to greatly increase the freezing rate.

In view of the aforesaid, the food freezing conveyor system of the present invention consisting of multiple conveyors and horizontal and perpendicular conveying mechanisms has the advantages of extended freezing operation zone, reduced energy loss and space economy. The design of induced freezing air circulation used in conjunction with chokes and conveyors which define a freezing air path for separating the freezing operation zone and the manhole space may prevent undue waste of energy and effectively utilize the energy in freezing food. Each conveyor is provided with parallel fins for increasing the heat transfer area so as to enhance the freezing rate and simplify maintenance and repairs work.

Although the present invention has been illustrated and described with reference to the preferred embodiments thereof, it should be understood that it is in no way limited to the details of such embodiments, but is capable of numerous modifications within the scope of the appended claims.

What is claimed is:

1. A food freezing conveyor system, comprising:

an air-tight freezing chamber;

a conveyor apparatus consisting of multiple tiers of conveyors, a lower horizontal conveying mechanism, a lifting conveying mechanism, an upper horizontal conveying mechanism and a dropping conveying mechanism, all mounted in said freezing chamber for conveying food products to be frozen along a substantially inverted-U shaped path;

a plurality of evaporators and a plurality of fan devices for generating freezing air currents of a suitable temperature for freezing food products;

said lifting conveying mechanism and said dropping conveying mechanism being respectively provided with multiple tiers of choke means thereon, each tier of said choke means and each tier of said conveyors commonly define a plurality of inter-communicating freezing air passages, separating freezing operation zones and non-freezing operation zones, and said evaporators and said fan devices being disposed substantially diagonally on opposite sides of said freezing chamber in such a way that at least one of said evaporators and at least one of said fan devices are arranged together at one side of said freezing chamber, with at least one of said evaporators and at least one of said fan devices provided together at the other side of said freezing chamber, the freezing air currents generated by said evaporators and said fan devices being drawn into each of said freezing air passages to flow through an upper zone of said lifting conveying mechanism, an upper zone of said dropping conveying mechanism, a lower zone of said dropping conveying mechanism, and a lower zone of said lifting conveying mechanism to complete an airflow cycle, the speed of the freezing air in said upper zone of said lifting conveying mechanism and said dropping conveying mechanism being higher than that of the freezing air in said lower zone of said lifting conveying mechanism and said lower zone of said dropping conveying mechanism.

2. A food freezing conveyor system as claimed in claim 1, wherein said lifting conveying mechanism and said dropping conveying mechanism respectively consist of two side chain sets, drive sprocket sets for driving said side chain sets, and equally spaced apart angle bars secured on said side chain sets, each tier of said angle bars respectively supporting each tier of said conveyors to displace perpendicularly when said two side chains sets are being driven by said drive sprocket sets, and each tier of said choke means being respectively provided just above each tier of said angle bars.

3. A food freezing conveyor system as claimed in claim 2, wherein each of said angles bar is provided with insert grooves in both sides of a vertical wall thereof, and each of said choke means has an inverted-U shaped clamp plate at a bottom side thereof, which may be disengageably fitted onto said vertical wall of said angle bar.

4. A food freezing conveyor system as claimed in claim 2, wherein each tier of said choke means is directly secured on said two side chains, and each tier of said choke means has a deflecting plate at a bottom side thereof, said deflecting plate bending forwardly and extending downwardly to overlap each tier of said angle bars.

5. A food freezing conveyor system as claimed in claim 2, wherein each tier of said choke means is a single choke plate having a length equivalent to that of each tier of said conveyors.

6. A food freezing conveyor system as claimed in claim 2, wherein each tier of said choke means has a length equivalent to that of each tier of said conveyors and consists of multiple overlapping plates, each of which being provided with a deflecting plate at one side thereof for overlapping one side of an adjacent plate.

7. A food freezing conveyor system as claimed in claim 1, wherein said at least one of said evaporators and said at least one of said fan devices disposed on a same side of said freezing chamber are arranged one on top of the other.

8. A food freezing conveyor system as claimed in claim 1, wherein said at least one of said evaporators and said at least one of said fan devices disposed on a same side of said freezing chamber are horizontally arranged with one in the front and the other at the back.

9. A food freezing conveyor system as claimed in claim 1, wherein said upper horizontal conveying mechanism and said lower horizontal conveying mechanism respectively comprise two side guide rails having a substantially C-shaped cross section for supporting each tier of said conveyors, two side chains provided with spaced projections, drive sprocket for driving said side chains to turn in a cycle, and vertical push plates secured between projections of said two side chains and in contact with an edge of each of said conveyors, said vertical push plates pushing each of said conveyors to progress transversely when said drive sprockets drive said side chains.

10. A food freezing conveyor system as claimed in claim 9, wherein a plurality of support elements and rollers are respectively provided on both sides of each tier of conveyors, each of said rollers being supported on the bottom surface of said side guide rails, so that said conveyors may be precisely positioned and supported by said side guide rails.

11. A food freezing conveyor system as claimed in claim 1, wherein a plurality of thermal conductive fins extend downwardly from a bottom side of each tier of said conveyors and are parallel to the direction of flow of the freezing air.

12. A food freezing conveyor system as claimed in claim 1, wherein said conveyors severally consist of a multiplicity of inter-connected thermal conductive plates, each of said thermal conductive plates being provided with a plurality of lugs alternately and equally spaced apart on both sides thereof, each of said lugs being provided with a coaxial hole such that when two of said thermal conductive plates are arranged adjacent to each other with said lugs of one of said thermal conductive plates meshing those of the other of said thermal conductive plates, a spindle may be passed through the respective coaxial holes of said lugs to join the two adjacent thermal conductive plates together.

13. A food freezing conveyor system as claimed in claim 12, wherein are thermal conductive plates are transversely and longitudinally inter-connected to form a conveyor with a determined length and width.

14. A food freezing conveyor system as claimed in claim 12, wherein each of said thermal conductive plates is provided with a plurality of thermal conductive fins extending from a bottom side thereof and being parallel to the direction of the flow of freezing air.

15. A food freezing conveyor system as claimed in claim 12, wherein each of said thermal conductive plates is die cast from materials of good thermal conductivity such as aluminum or other metals or non-metals.

16. A food freezing conveyor system as claimed in claim 1, wherein an entrance and an exit of said freezing chamber are respectively provided with an auxiliary freezing chamber for reducing dissipation of freezing air through said entrance and said exit.

17. A food freezing conveyor system as claimed in claim 1, wherein each of said fan devices is driven by a drive motor provided on the outside of said freezing chamber.

* * * * *